United States Patent

[11] 3,584,937

[72] Inventor Yoshio Nishimoto
      Tokyo, Japan
[21] Appl. No. 844,317
[22] Filed July 24, 1969
[45] Patented June 15, 1971
[73] Assignee Olympus Optical Co., Ltd.
      Shibuyaku, Tokyo, Japan
[32] Priority Aug. 9, 1968
[33] Japan
[31] 43/56185

[54] FOLDED REFLECTING MICROSCOPE OBJECTIVE
2 Claims, 2 Drawing Figs.
[52] U.S. Cl. ................................... 350/294, 350/199
[51] Int. Cl. .................................... G02b 5/10, G02b 17/00
[50] Field of Search ........................... 350/294, 199, 55

[56] References Cited
UNITED STATES PATENTS
2,682,197 6/1954 Davis ........................... 350/199
2,684,015 7/1954 Grey ............................ 350/294X Primary Examiner—David Schonberg
Assistant Examiner—John W. Leonard
Attorney—Kurt Kelman ABSTRACT: Reflecting microscope objective comprising a major concave reflecting mirror and a minor convex reflecting mirror coaxially located in spaced relation therefrom so that the light from an object is reflected by the major concave reflecting mirror toward the minor convex reflecting mirror to be again reflected thereby toward means such as eyepiece means of a microscope on which the reflecting microscope objective is mounted. A plane reflecting mirror is provided rearwardly of the minor convex reflecting mirror in spaced relation therefrom and the major concave reflecting mirror is located at the object side with respect to the plane reflecting mirror so that the light from the object is first received by the plane reflecting mirror so as to be reflected toward the major concave reflecting mirror, the light received thereby being again reflected toward the plane reflecting mirror which in turn reflects the thus received light to the minor convex reflecting mirror so as to be reflected toward means such as the eyepiece means.

INVENTOR
YOSHIO NISHIMOTO 3,584,937

FOLDED REFLECTING MICROSCOPE OBJECTIVE

BACKGROUND OF THE INVENTION

The present invention relates to a reflecting microscope objective.

A reflecting microscope objective having been used heretofore comprises a major concave reflecting mirror facing to an object and a minor convex reflecting mirror coaxially located in front of the major concave reflecting mirror facing thereto and a distance spaced therefrom so that the light from the object is received by the major concave reflecting mirror so as to be reflected thereby toward the mirror convex reflecting mirror. The light received by the minor convex reflecting mirror is again reflected toward means such as eyepiece means of a microscope on which the reflecting microscope objective is mounted through an opening provided in the major concave reflecting mirror so that magnified image of the object is obtained.

In such a construction of the reflecting microscope objective, the distance between the object and the objective becomes in general greater as the magnification of the objective is made lower. Therefore, it is very difficult to design a reflecting objective of low magnification which has the same conjugate distance as that of a reflecting objective of high magnification, if there is a limitation in the mechanical mounting position of the objective. Should a reflecting objective of low magnification be designed in the conventional manner while the limitation in the mechanical mounting position is maintained, the effective factor of the objective is made extremely small thereby making the thus designed objective impracticable.

The present invention aims at avoiding the above-described disadvantages of the prior art reflecting microscope objective and providing a novel and useful reflecting microscope objective.

SUMMARY OF THE INVENTION

An object of the present invention is to provide a novel and useful reflecting microscope objective which avoids the disadvantages of the prior art reflecting objective.

The other object of the present invention is provide a novel and useful reflecting microscope objective which is compact in size but in which the distance between the object and the rear end of the objective is made small so that an appropriate mechanical mounting position of the objective can be set therein while a sufficient working distance is provided.

A further object is to provide a novel and useful reflecting objective of low magnification which has the same conjugate distance as that of a reflecting objective of high magnification thereby permitting the decrease in the effective factor of the objective to be prevented under the limitation in the mechanical mounting position of the objective.

These objects of the present invention are achieved by the characteristic feature of the present invention by the provision of a plane reflecting mirror located behind the minor convex reflecting mirror appropriately spaced therefrom in facing relation thereto so that the major concave reflecting mirror is located at the object side with respect to the plane reflecting mirror in facing relation thereto. The location of the major concave reflecting mirror in accordance with the present invention is in mirror symmetry with respect to the plane reflecting mirror to a major concave reflecting mirror if it were arranged in accordance with the technique of the prior art reflecting microscope objective as described previously.

Thus, the light from an object is first received by the plane reflecting mirror and reflected thereby toward the major concave reflecting mirror. The light received by the major concave reflecting mirror is again reflected thereby toward the plane reflecting mirror and the light received thereby is further reflected toward the minor convex reflecting mirror so as to be reflected thereby toward means such as eyepiece means of the microscope on which the reflecting objective is mounted. The major concave reflecting mirror and the plane reflecting mirror are formed therein appropriate openings, respectively, so as to pass therethrough the light.

By the construction as described above, the distance between the object and the rear end of the objective can be made small thereby permitting the mechanical mounting position to be set appropriately in the objective even in case of an objective of low magnification while a sufficient working distance is maintained. Thus, it is made easy to design a reflecting objective of low magnification which has the same conjugate distance as that of an objective of high magnification, which design has been very difficult in the prior art.

Further, a reflecting objective constructed in accordance with the present invention can be made compact in size.

DETAILED DESCRIPTION OF THE PREFERRED EMBODIMENT

Figure 1:
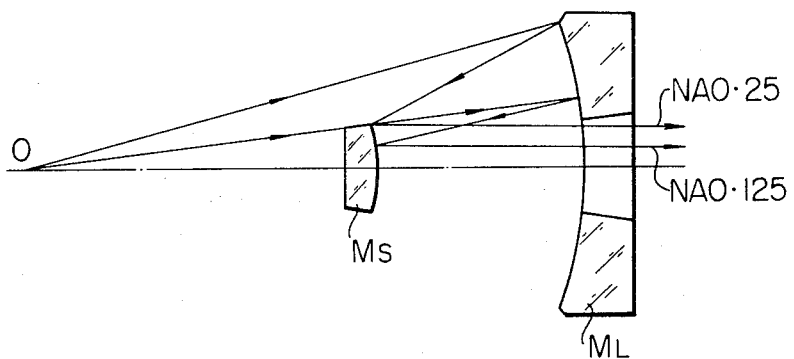
FIG. 1 is a schematic view showing an example of the reflecting microscope objective of the prior art.

FIG. 1 shows an example of the prior art reflecting objective. A major concave reflecting mirror $M_L$ is located in facing relation to an object 0 a distance spaced therefrom. The major concave reflecting mirror $M_L$ is provided with an opening for passing therethrough the light to be directed toward means such as eyepiece means (not shown) of the microscope on which the reflecting objective is mounted as hereinbelow described.

A minor convex reflecting mirror $M_S$ is located coaxially in front of the major concave reflecting mirror $M_L$ a distance spaced therefrom in facing relation thereto.

The light from the object 0 is first received by the major concave reflecting mirror $M_L$ and reflected thereby toward the minor convex reflecting mirror $M_S$. The light received by the minor convex reflecting mirror $M_S$ is again reflected toward the means such as eyepiece means through the opening in the major concave reflecting mirror $M_L$ so that a magnified image of the object 0 is obtained. The magnification is determined depending upon the location and convature of each of the major and minor reflecting mirrors $M_L$, $M_S$.

As shown in FIG. 1, the distance between the object 0 and the rear end of the reflecting objective, that is, the major concave reflecting mirror $M_L$ is relatively long thereby making it difficult to appropriately set the mechanical mounting position in the objective, particularly in the case of low magnification objective.

Figure 2:
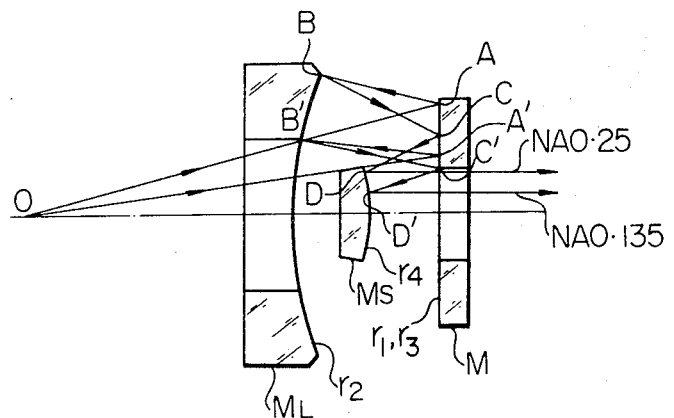
FIG. 2 is a view similar to FIG. 1 but showing an embodiment of the reflecting microscope objective constructed in accordance with the present invention.

FIG. 2 shows an embodiment of the reflecting objective of the present invention. As shown in FIG. 2, a plane reflecting mirror M having an opening therein is provided behind the minor convex reflecting mirror $M_S$ a distance spaced therefrom in facing relation thereto. The position of the plane reflecting mirror M lies intermediate the minor convex reflecting mirror $M_S$ and a major concave reflecting mirror if it were provided according to the technique of the prior art reflecting objective.

As shown in FIG. 2, a major concave reflecting mirror $M_L$ is located at the object side with respect to the plane reflecting mirror M a distance spaced therefrom in facing relation thereto. The location of the major concave reflecting mirror $M_L$ is in mirror symmetry with respect to the plane reflecting mirror M to a major concave reflecting mirror if it were provided in accordance with the technique of the prior art reflecting objective.

It is clear from the drawing that the reflecting objective of FIG. 2 can be made compact with the objective as a whole shifted nearer to the object 0 in comparison with the prior art reflecting objective as shown in FIG. 1, thus permitting a low magnification reflecting objective having the same conjugate distance as that of a high magnification reflecting objective to be easily designed.

The function of the reflecting objective shown in FIG. 2 is as follows.

The light from the object 0 is first received by the plane reflecting mirror M and reflected thereby toward the major concave reflecting mirror $M_L$. The light received by the major concave reflecting mirror $M_L$ is reflected again toward the plane reflecting mirror M so as to be reflected thereby toward the minor convex reflecting mirror $M_S$, the light received by the minor convex reflecting mirror $M_S$ being reflected toward means such as eyepiece means of the microscope on which the reflecting objective is mounted.

Points A, B, C and D and points A', B', C' and D' in FIG. 2 designate the respective reflecting positions of the light rays from the object 0 having the maximum numerical aperture NAmax and the minimum numerical aperture NAmin, respectively, on the plane reflecting mirror M, the major concave reflecting mirror $M_L$ and the minor convex reflecting mirror $M_S$, respectively. In order to allow the light rays from the object 0 having the maximum NAmax and the minimum NAmin to pass through the major concave reflecting mirror $M_L$ and the plane reflecting mirror M, the point B' on the major concave reflecting mirror $M_L$ must be radially outside of the light ray OA and the point C' on the plane reflecting mirror M must be radially outside of the light ray reflected at the point D toward means such as eyepiece means by the mirror convex reflecting mirror $M_S$ by appropriately selecting the size, shape and location of each of the elements and the size of each of the openings in the mirrors $M_L$ and M. This condition reduces the effective factor of the reflecting objective a certain amount in comparison with a reflecting objective of the conventional design. However, by appropriately selecting the position of the plane reflecting mirror M, the decrease in the effective factor of the reflecting objective can be made to the minimum, thereby affording sufficient practicability thereto.

An example of the numerical data of the reflecting objective of the present invention is as follows.

Conjugate distance: 183.8
Maximum NAmax: 0.25
Minimum NAmin: 0.135
Magnification: 10.0
Effective factor: 46 percent
Object distance: 37.3
Distance of the major concave
   reflecting mirror from the plane
   reflecting mirror $d_1$: −12.6
Distance of the plane reflecting
   mirror from the major concave
   reflecting mirror $d_2$: 12.6
Distance of the minor convex
   reflecting mirror from the plane
   reflecting mirror $d_3$: −6.23
Curvature of the plane
   reflecting mirror $r_1, r_3$: ∞
Curvature of the major concave
   reflecting mirror $r_2$: 35.151
Curvature of the minor convex
   reflecting mirror $r_4$: −17.553

For the purpose of reference, an example of the numerical data of a reflecting objective of the prior art is shown below.

Conjugate distance: 183.8
Maximum NAmax: 0.25
Minimum NAmin: 0.125
Magnification: 10.0
Effective factor: 50 percent
Object distance: 49.9
Distance of the minor convex
   reflecting mirror from the
   major concave reflecting mirror $d_1$: −18.83
Curvature of the major concave
   reflecting mirror: −35.151
Curvature of the minor convex
   reflecting mirror: −17.553

As is clear from the above data, the reflecting objective constructed in accordance with the present invention has a sufficient short distance between the object and the rear end of the objective in comparison with the prior art reflecting objective thereby permitting the mechanical mounting position of the objective to be set appropriately therein while a sufficient working distance is maintained even in the case of a low magnification objective.

I claim:

1. Reflecting microscope objective comprising a major concave reflecting mirror and a minor convex reflecting mirror coaxially located in spaced relation therefrom so that the light from an object is reflected by said major concave reflecting mirror toward said minor convex reflecting mirror to be again reflected thereby toward means such as eyepiece means of a microscope on which the reflecting microscope objective is mounted, wherein the improvement comprises a plane reflecting mirror located rearwardly of said minor convex reflecting mirror in spaced relation therefrom, said major concave reflecting mirror being located at the object side with respect to said plane reflecting mirror in spaced relation therefrom thereby permitting the light from the object to be reflected by said plane reflecting mirror toward said major concave reflecting mirror to thereby be reflected again toward said plane reflecting mirror so that the light received by said plane reflecting mirror is reflected toward said minor convex reflecting mirror so as to be reflected again toward means such as the eyepiece means of the microscope.

2. Reflecting microscope objective according to claim 1 and having the following data:

Conjugate distance: 183.8
Max. NA: 0.25
Min. NA: 0.135
Magnification: 10.0
Effective factor: 46 percent
Objective distance: 37.3
Distance of major concave reflecting mirror
   from plane reflecting mirror in optical axis: −12.6
Distance of plane reflecting mirror from
   major concave reflecting mirror in
   optical axis: 12.6
Distance of minor convex reflecting mirror
   from plane reflecting mirror in
   optical axis: −6.23
Curvature of plane reflecting
   mirror $r_1$: ∞
Curvature of major concave
   reflecting mirror $r_2$: 35.151
Curvature of plane reflecting
   mirror $r_3$: ∞
Curvature of minor convex
   reflecting mirror $r_4$: −17.533